(12) United States Patent
Damm et al.

(10) Patent No.: US 7,096,454 B2
(45) Date of Patent: Aug. 22, 2006

(54) METHOD FOR GESTURE BASED MODELING

(75) Inventors: Christian Heide Damm, Århus (DK); Klaus Marius Hansen, Risskov (DK); Michael Thomsen, Århus (DK); Michael Tyrsted, Århus (DK)

(73) Assignee: Tyrsted Management ApS, Silkeborg (DK)

( * ) Notice: Subject to any disclaimer, the term of this patent is extended or adjusted under 35 U.S.C. 154(b) by 658 days.

(21) Appl. No.: 10/240,188

(22) PCT Filed: Mar. 27, 2001

(86) PCT No.: PCT/DK01/00204

§ 371 (c)(1), (2), (4) Date: Oct. 31, 2002

(87) PCT Pub. No.: WO01/75568

PCT Pub. Date: Oct. 11, 2001

(65) Prior Publication Data

US 2004/0060037 A1 Mar. 25, 2004

(51) Int. Cl.
*G06F 9/44* (2006.01)
*G06F 9/45* (2006.01)

(52) U.S. Cl. .................. 717/105; 717/104; 717/113
(58) Field of Classification Search ........ 717/104–108, 717/109, 113–116
See application file for complete search history.

(56) References Cited

U.S. PATENT DOCUMENTS

| | | |
|---|---|---|
| 5,555,357 A | 9/1996 | Fernandes et al. |
| 5,583,542 A | 12/1996 | Capps et al. |
| 5,636,297 A | 6/1997 | Eller et al. |
| 5,745,116 A | 4/1998 | Pisutha-Arnond |
| 5,790,114 A | 8/1998 | Geaghan et al. |
| 5,809,267 A | 9/1998 | Moran et al. |
| 5,838,973 A * | 11/1998 | Carpenter-Smith et al. . 717/105 |
| 5,861,886 A | 1/1999 | Moran et al. |
| 5,867,596 A | 2/1999 | Kano et al. |
| 6,018,346 A | 1/2000 | Moran et al. |
| 6,049,327 A | 4/2000 | Walker et al. |
| 6,057,845 A | 5/2000 | Dupouy |
| 6,175,954 B1 * | 1/2001 | Nelson et al. ............... 717/105 |
| 6,341,368 B1 * | 1/2002 | Deans ......... 717/100 |
| 6,552,722 B1 * | 4/2003 | Shih et al. ................... 345/419 |
| 6,606,741 B1 * | 8/2003 | Kojima et al. .............. 717/109 |
| 6,704,743 B1 * | 3/2004 | Martin .................... 707/103 R |
| 6,831,640 B1 * | 12/2004 | Shih et al. ................... 345/419 |

(Continued)

FOREIGN PATENT DOCUMENTS

EP 0929030 7/1999

(Continued)

OTHER PUBLICATIONS

Cheng et al, "Formalizing and integrating the dynamic model for object oriented modeling" IEEE Trans. of Software Engineering vol. 28, No. 8, pp. 747762, 2002.*

(Continued)

*Primary Examiner*—Anil Khatri
(74) *Attorney, Agent, or Firm*—James Creighton Wray

(57) ABSTRACT

A computer program based method is described for creating models using gestures. On an input device, such as an electronic whiteboard, a user draws a gesture which is recognized by a computer program and interpreted relative to a predetermined meta-model. Based on the interpretation, an algorithm is assigned to the gesture drawn by the user. The executed algorithm may, for example, consist in creating a new model element, modifying an existing model element, or deleting an existing model element.

23 Claims, 11 Drawing Sheets

U.S. PATENT DOCUMENTS

Figure 1:
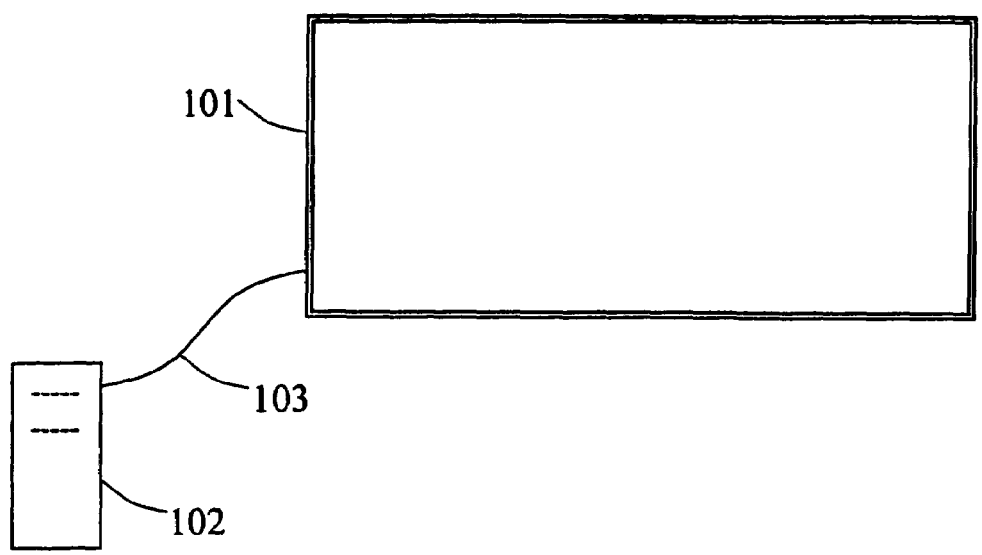

| | | |
|---|---|---|
| 6,845,503 B1 * | 1/2005 | Carlson et al. ............. 717/166 |
| 6,898,782 B1 * | 5/2005 | Brodsky et al. ............ 717/104 |
| 6,904,588 B1 * | 6/2005 | Reddy et al. ............... 717/104 |

FOREIGN PATENT DOCUMENTS

| | | |
|---|---|---|
| WO | WO 98/14888 | 4/1988 |
| WO | WO 98/21650 | 5/1988 |
| WO | WO 99/19788 | 4/1999 |
| WO | WO 99/59312 | 11/1999 |

OTHER PUBLICATIONS

Chung et al, "Modeling web applications using Java and XML related technologies", IEEE HICSS, pp. 1-10, 2003.*

Nishino et al, "3D object modeing using spatial and pictographic gestures", ACM VRST, pp. 51-58, 1998.*

Damm et al, "Tools support for coperative object orientd design gesture nased modeling on an electronic witheboard", ACM CHI, vo. 2, issue 1, pp. 518-525, 2000.*

Rubine,D.; *Specifying Gestures by Example*; Jul. 1991; ACM SIGGRAPH Computer Graphics; vol. 25:4; pp. 329-337.

Landay & Myers: *Interactive Sketching for the Early Stages of User Interface Design*: 1995; In Proceedings of CHI'95; pp. 45-50.

Moran et al.; *Tailorable Domain Objects as Meeting Tools for Electronic Whiteboard*; 1998; In Proceedings ACM/CSCW'98, Seattle, WA; pp. 295-304.

Pedersen et al.; *Tivoli: An Electronic Whiteboard for Informal Workgroup Meetings*; 1993; in proceedings of InterCHI; pp. 391-398.

Igarashi et al.; *Interactive Beautification: A Technique for Rapid Geometric Design*; 1997; Proceedings of UIST 97; Banff, Alberta, Canada; pp. 105-114.

Lin et al.; *DENIM: Finding a Tighter Fit Between Tools and Practice for Web Site Design*.

Moran et al.; *Spatial Interpretation of Domain Objects Integrated into a Freeform Electronic Whiteboard*; 1998; Proceedings of UIST 98; San Francisco, CA; pp. 175-184.

Mynatt et al.; *Flatland: New Dimensions in Office Whiteboards*; 1999; Proceedings of CHI 99; Pittsburgh, PA; pp. 346-353.

Gross et al.; *Ambiguous Intentions: A Paper-like Interface for Creative Design*; 1996; Proceedings of UIST 96; Seattle, WA; pp. 183-192.

Rubine, Dean; *Combining Gestures and Direct Manipulation*; 1992; Proceedings of CHI 92; pp. 659-660.

Jarzabek et al.; *The Case for User-centered CASE Tools*; Aug. 1998; Communications of the ACM; vol. 41(8); pp. 93-99.

Gamma et al.; *Design Patterns: Abstraction and Reuse of Object-oriented Design*; 1993; Proceedings of ECOOP 93; pp. 406-431.

Kurtenbach et al.; *The Limits of Expert Performance Using Hierarchic Marking Menus*; 1993; Proceedings of CHI 93,; Apr. 24-29, 1993; pp. 482-487.

McLennan, M. J.; *Object-oriented Progamming iin TCL*; 1993; Proceedings of TCL/TK Workshop; Jun. 10-11, 1993, University of California, Berkeley, CA.

Ousterhout, J.; *TCL: An Embeddable Command Language*; 1990; Proceedings of the Winter 1990 USENIX Conference, Jan. 22-26, 1990, Washington, DC.

Foss et al.; *A Field Study of the Industrial Modeling Process*.

Bosak et al.; *Extensible Markup Language (XML) 1.0 (Recommended Specification)*; Feb. 10, 1998; W3C XML Working Group; 32 pages.

* cited by examiner

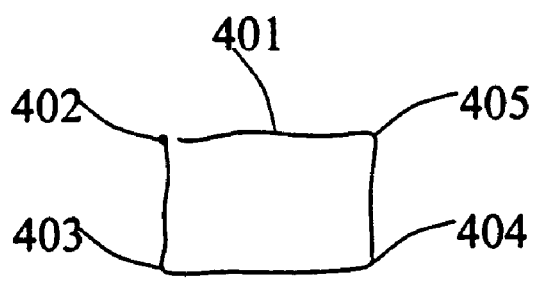 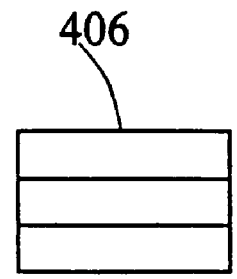
FIG. 4a　　　　FIG. 4b

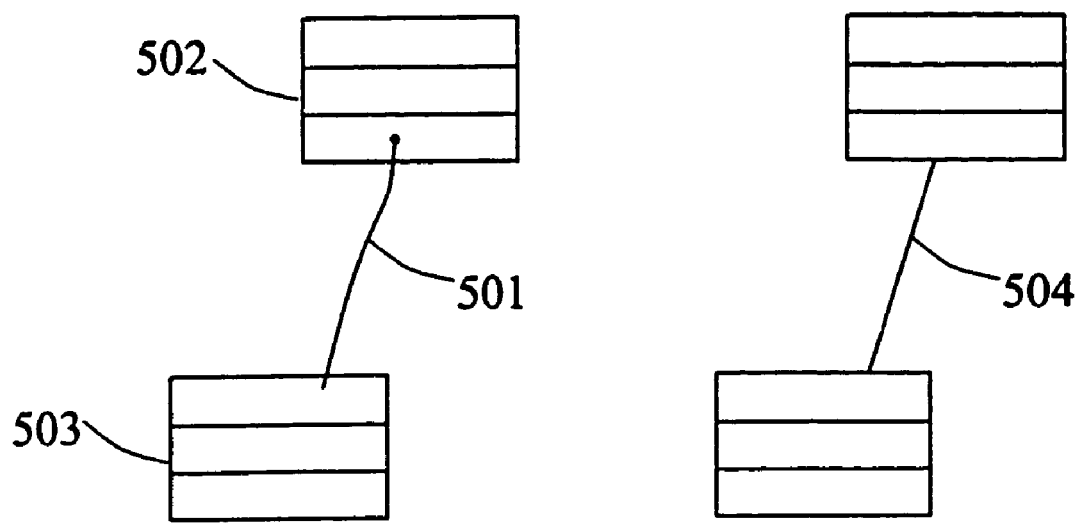
FIG. 5a  FIG. 5b

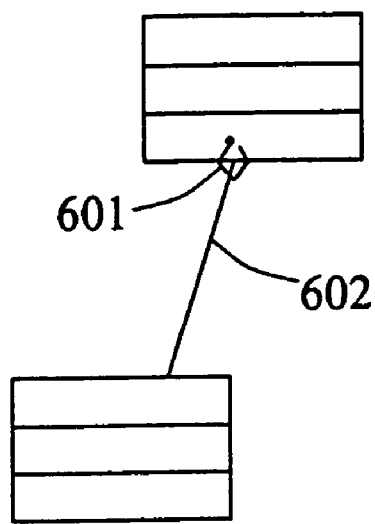 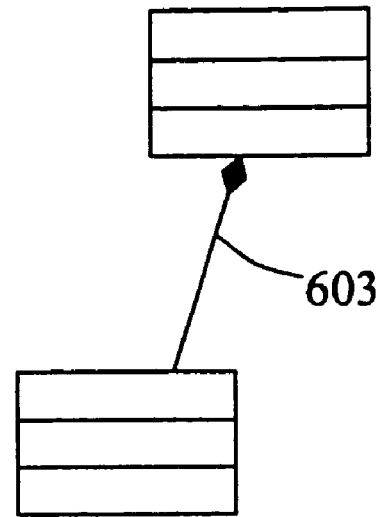
FIG. 6a  FIG. 6b

| Gesture | Example Algorithm | Before | After | Variations of gesture |
|---|---|---|---|---|
| ▢ | Create a UML class | ▢ | ▤ | ▢ ▢ |
| ⌐┐ | Create a UML package | 🗀 | 🗀 | 🗀 🗀 |
| ◯ | Create a UML use case | ◯ | ◯ | ◯ ◯ |
| \ | Create a UML dependency | 🗀—🗀 | 🗀--🗀 | \ / |
| ⟲— | Move a UML class | ▤— | ▤ | ⟲ ⟲ |
| /\/ | Delete a UML class | ▤/\/ | | /\/ z s |
| △ | Create a UML generalization | ▤↑ | ▤↑ | △ △ |
| ∧ | Change navigability of UML association | ▤↑ | ▤↑ | ∧ ∧ |

FIG. 7

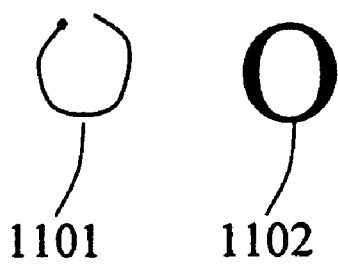
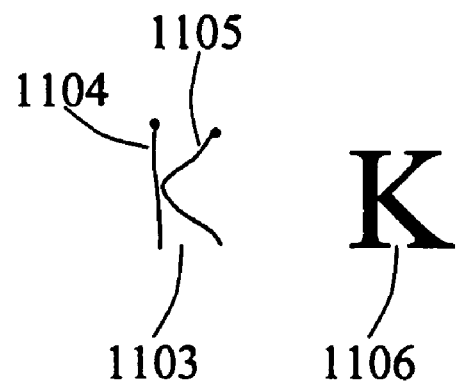
FIG. 11a  FIG. 11b

METHOD FOR GESTURE BASED MODELING

This application claims the benefit of Danish Application No. 2000 00538 filed Mar. 30, 2000, Danish Application No. PA 2001 00112 filed Jan. 23, 2001 and PCT/DK01/00204 filed Mar. 27, 2001.

BACKGROUND OF THE INVENTION

1. Field of the Invention

The present invention relates to gesture based modeling.

2. Description of Prior Art

Object-oriented programming languages provide many technical qualities but, more importantly, object-oriented languages and object-oriented development in general also provide a conceptual framework for understanding and modeling. This conceptual framework provides abstraction mechanisms for modeling, such as concepts (classes), phenomena (objects), and relations between these (inheritance, association, dependency) that allow developers to describe what their system is all about and to formulate solutions on a higher level of abstraction than program code.

In practice, developers build models at several abstraction levels. The program code can be seen as an executable model, but for purposes such as analysis, specification, documentation, and communication, models visualized graphically in the form of diagrams are often used. The Unified Modeling Language, UML [Rumbaugh, J., Jacobson, I., & Booch, G. (1999). *The Unified Modeling Language Reference Manual*. Addison Wesley] is a prominent example of a graphical notation that is used for such purposes. The Unified Modeling Language is a general-purpose visual modeling language that is used to specify visualize, construct, and document the artifacts of a software system.

Models have two major aspects: semantic information (semantics) and visual presentation (notation). Semantic model elements carry the meaning of the model, and they are used for code generation, validity checking, complexity metrics etc. The semantic information is often for simplicity called the model. The visual presentation shows semantic information in a form that can be seen, browsed, and edited by humans. Presentation elements carry the visual presentation of the model—that is, they show it in a form directly apprehensible by humans. Presentation elements are shown on diagrams. The UML is formally defined using a metamodel—a model of the constructs in UML. The UML metamodel defines how a definite model may be constructed, i.e., it defines the set of all legal UML models.

UML models are often used in object-oriented software development. Simplistically, object-oriented software development can be viewed as mapping a set of real-world phenomena and concepts to corresponding objects and classes. The set of real-world phenomena and concepts is called the referent system and the corresponding computerized system is called the model system.

Mapping a referent system to a model system is called modeling. Modeling is often iterative, and it is thus important to be able to discuss a model system in terms of the referent system. We call this reverse process interpretation. Modeling is concerned with expressing an understanding of a referent system in a fluent, formal, and complete way, for which usable and formal notations, such as diagramming techniques, are crucial. Interpretation is concerned with understanding a model system in terms of the referent system. For doing this, it is important that central concepts in a model system are understandable in the referent system.

Neither understanding the referent system nor building a model system is unproblematic. Understanding the referent system is within the domain of user-oriented disciplines such as ethnography and participatory design. The ethnographic perspectiv on system development is concerned with basing system design on actual work performed within the referent system. The participatory design perspective on system design is concerned with designing systems in active collaboration with potential users. Both perspectives produce knowledge of the referent system. Finally, building the model system is within the domain of object-oriented software engineering. Software engineering is concerned with building robust, reliable, and correct systems. In iterative development, then, co-ordination, communication, and collaboration between different perspectives and individual developers is crucial. Thus, when considering tool support for a system development process, tool support for the modeling and the interpretation processes is important.

In iterative development, modeling and interpretation are interleaved. When different competencies work together, it is crucial that both processes are, to a certain extent, understood by all involved parties. For example, during user involvement it is both important that the developers understand the work of the users (i.e., the referent system) and that the users are able to react on and help design the application (i.e., the model system.)

The so-called Computer-Aided Software Engineering tools (CASE tools) are diagram editors that provide tool support for modeling. These tools let a user design a system using a graphical design notation and usually generate at least code skeletons or a code framework. CASE tools, among other things, help users to create, edit, and layout diagrams, to perform syntactic and semantic checks of models, to simulate and test models, to share diagrams between and combine diagrams from several users, to generate code or code skeletons from models (forward engineering) and generate diagram or diagram sketches from code (reverse and round-trip engineering), and to produce documentation based on models and diagrams. Many CASE tools are based on UML, i.e., they allow users to create UML models and diagrams.

Examples of commercially available CASE tools are Rational Rose® and Microgold With-Class™.

But even though CASE tools offer these many attractive features, they are in practice not widely and frequently used. CASE tools clearly support design and implementation phases, but have less support for the initial phases, when the focus is on understanding the problem domain and on modeling the system supporting the problem domain [Jarzabek, S. & Huang, R. (1998) The Case for User-Centered CASE Tools. *Communications of the ACM*, 41 (8)].

In practice, CASE tools are supplemented with whiteboards in the creative phases of development. The most appealing aspects of whiteboards are their ease of use and their flexibility. Whiteboards require no special skills, they do not hamper the creativity of the user, and they can be used for a variety of tasks. Their many advantages aside, for most development projects whiteboards are not sufficient, as they do not support, for example, advanced editing and loading and saving a diagram.

It would thus be desirable if CASE tools had support for intuition, flexibility, and collaboration, giving a more direct, less complex user-interface, while preserving the current support for more technical aspects such as implementation, testing, and general software engineering issues.

As user studies have shown [Damm, C. H., Hansen, K. M., & Thomsen, M. (2000). Tool Support for Cooperative Object-Oriented Design: Gesture Based Modeling on an Electronic Whiteboard. In *Proceedings of Computer Human Interaction* (CHI'2000), The Hague, The Netherlands], CASE tools are primarily used for code generation, reverse engineering, and documentation, whereas whiteboards are used for collaborative modeling and idea generation. This mix causes a number of problems: Whereas whiteboards are ideal for quickly expressing ideas collaboratively and individually, they are far from ideal for editing diagrams etc. This means that in all the user studies, drawings have been transferred from whiteboards to CASE tools and from CASE tools back to whiteboards. The conflicting advantages and disadvantages of whiteboards and CASE tools thus lead to frustrating and time consuming switches between the two technologies.

Electronic whiteboards have been used as a computational extension of traditional whiteboards. A goal in systems running on electronic whiteboards has often been to preserve desirable characteristics of whiteboards such as lightweight interaction and informality of drawings.

From a project at the University of California, it is known to combine the versatility of an electronic whiteboard with object-oriented modeling. An electronic whiteboard is coupled to a sketch interpreter in order to recognize a variety of drawn gestures on the whiteboard as classes and relations in UML static structure diagrams. However, though the method facilitates modeling of UML diagrams, the method does not imply the variety of features and modeling possibilities as known from CASE tools.

It is the purpose of the invention to provide a method for modeling employing the ease and flexibility of user-friendly input and output devices, such as whiteboards where the modeling is dependent on predetermined metamodels, for example to secure compatibility with external computer programs, preferably CASE tools.

DESCRIPTION OF THE INVENTION

The purpose of the present invention is achieved by a method for gesture based modeling. The method includes a predetermined metamodel for a model including a number of general elements and possible relations between these general elements. The method also includes a number of predetermined general gestures with each gesture linked to at least on general algorithm. The model provides a reading of an input gesture. The method compares said input gesture with said number of predetermined general gestures and identifies at least one specific gesture among said predetermined general gestures as resembling said input gesture. The method assigns among said at least one general algorithm a specific algorithm to said specific gesture. The method determines the allowance of said specific algorithm according to said metamodel and model. In the case of allowance, upon request as a response to said specific gesture the method modifies said model in accordance with said specific algorithm. In the case of allowance, upon request, the method modifies a diagram representing said model on an output display to indicate the response to said input gesture.

The core of the invention is embodied as a computer program which in one embodiment works as a stand-alone program for construction of diagrams/models and in another embodiment as a plug-in interface between on the one hand different user-friendly input and output media, for example, a whiteboard or a touch sensitive computer screen and on the other hand different external programs, for example CASE tools as Rational Rose® or Microgold WithClass™.

The method according to the invention is a gesture based modeling tool, where the models that can be created are linked to a metamodel, which has been determined in advance.

In principle, the invention works as a tool for creating any kind of diagram, where the diagram represents the graphical notation for a model. The term diagram has to be understood in a wide sense, such that also drawings, for example technical sketches, with general elements, for example boxes, lines, or curves, are to be understood as diagrams. However, the invention differs from prior art in that the possible diagrams that can be created by the user are limited to those diagrams and corresponding models, which are allowed by the predetermined metamodel. By defining a metamodel in advance, the user or group of users working at the same input device or output device, is prevented from creating diagrams and corresponding models with structural mistakes, which is a great advantage for the working process. During the creation of the diagram and corresponding model, the user will be controlled on-line by the metamodel, and the user will be informed during his diagramming, whether the elements and the relations between elements in the diagram and corresponding model are acceptable or not.

A key ingredient is the user-friendliness of the method in that input is gesture based. An input gesture from the user can be a handdrawn curve, for example a box or a line, on an input device as an electronic whiteboard. However, the input device can also be a touch-sensitive computer screen, a drawing tablet, a mouse, a pen-based computer, a joy stick system coupled to a computer, or even a movement sensor system, where the gesture of the user is performed in free space and read by the sensor due to light or sound detection. In all cases, feedback is given to the user on the output device in the form of a curve shaped exactly as the movement read by the input device. After interpretation of the drawn gesture, the feedback curve is removed, and the drawing is changed in accordance with an algorithm that is linked to the interpreted gesture.

It should be acknowledged that a gesture in this sense differs from a simple mouse operation in known computer programs, where a pointer on a computer screen is steered with the mouse, for example in connection with drag-and-drop, or a function is initiated by a mouse click operation. In contrast to gestures according to the invention, these operations do not provide feedback to the user on the output device in the form of a curve shaped exactly as the movement of the input device As exemplified in FIG. 11a and FIG. 11b, a gesture may consist of one or more curves. As an example of a gesture consisting of one curve, consider an O-shaped gesture 1101, which results in the letter O 1102. Gestures consisting of one curve are sufficient in most situations, but for more complex symbol, gestures consisting of several curves—complex gestures—may be more appropriate, because visual similarity with the result of the gesture is hard to obtain with a single curve. As an example, consider a K-shaped gesture 1103, which is composed by a vertical curve 1104 and an angled curve 1105 and results in the letter K 1106.

A further alternative is reading of input gestures from a database, where a sequence of input gestures has been stored from an input device beforehand. The latter opens the possibility for performing a number of input gestures before computer capacity is used for identification.

After reading of an input gesture, for example from an input device, the input gesture is compared to a number of predetermined general gestures, which are stored in the system. The predetermined general gestures are those gestures that have been determined to be generally allowable in accordance with the notation and the metamodel.

Usually, the gesture input from the user will not be of a form which is precisely equal to the general gesture. However, the computer program will compare the input gesture with the predetermined general gestures and identify a number of specific gestures among the general gestures which resemble the input gesture the most.

To each specific gesture, a number of specific algorithms are linked. Examples of algorithms are drawing certain elements, linking certain elements, transforming certain elements, deleting certain elements, and moving certain elements.

Having determined the specific gesture, the allowance of that gesture and the corresponding algorithm is controlled in accordance with the metamodel. It may be that the input gesture and corresponding algorithm is allowable as such, but hat it is not allowable in the present context in the model. If this is the case, the gesture and corresponding algorithm is not allowable, and the user is notified. For the notification, a connected visual output device can be used or a sound generator. In the simplest and preferred embodiment, the user is notified in the way, that no change occurs on the output device, but alternatively a failure message or a certain symbol is displayed on the output device.

If the identified input gesture is accepted, the model is modified in accordance with the algorithm linked to the gesture, and the diagram that represents the actual model is changed accordingly. However, the modification according to the algorithm is only performed if the computer program receives a request for the modification. This request can be of various natures. The request can be the simple lifting of the drawing pen from the electronic whiteboard. It can also be a certain command given by the user with the pointing device. Alternatively, the request may occur automatically when the user stops drawing for a certain time period, for example a few seconds.

In certain cases, the input gesture is ambiguously recognized by the program, for example if the gesture is performed so imprecisely that it can be assigned to two different general gestures. Therefore, in a further embodiment of the invention, the identification of the gesture is linked to a quantitative measure reflecting the possibility that the specific gesture actually resembles the input gesture. This quantitative measure can be used to indicate the uncertainty of the recognition of the gesture to the user. If, for example, the program cannot recognize the gesture, it will propose a gesture with a very low probability, eventually zero probability.

In order that the method according to the invention can be used directly in connection with a different external program, for example a drawing program, a CASE tool computer program or another type of software engineering tool, the electronic format of the model, or alternatively of the modification of the model, is, if necessary, changed to a format that is readable by the external program. This way, the model with the modifications can be implemented in the external computer program. On the other hand, the response of the external program can be read after a retranslation of the format.

In one embodiment, the method according to the invention is linked to a modeling language that supports object-oriented modeling, especially UML.

The gesture recognition can be performed in different ways, for example by utilizing Rubine's algorithm [Rubine, D. (1991). Specifying Gestures by Example. In *Proceedings of SIGGRAPH'91*, 329–337].

SHORT DESCRIPTION OF THE DRAWINGS

Figure 2:
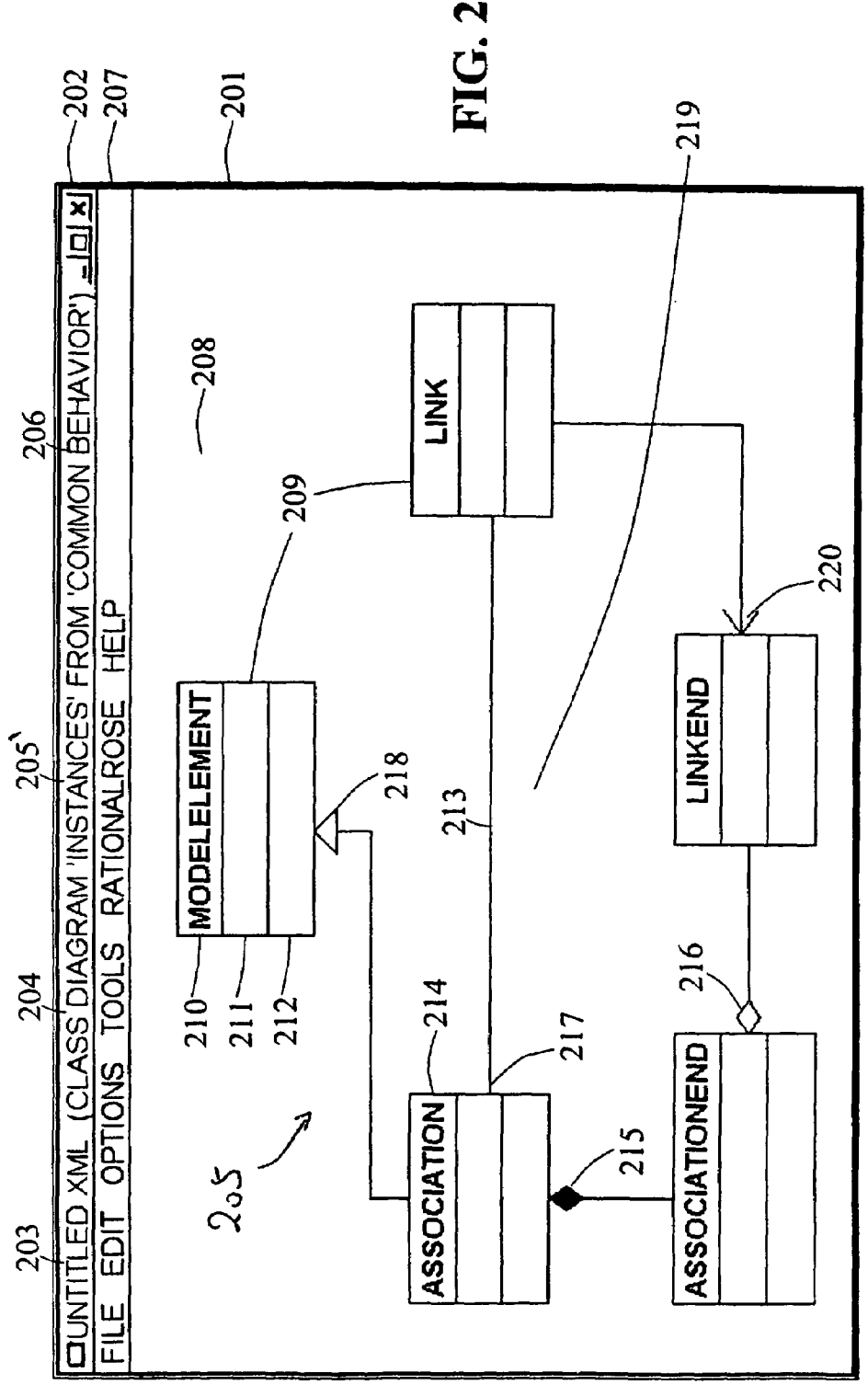
Figure 3:
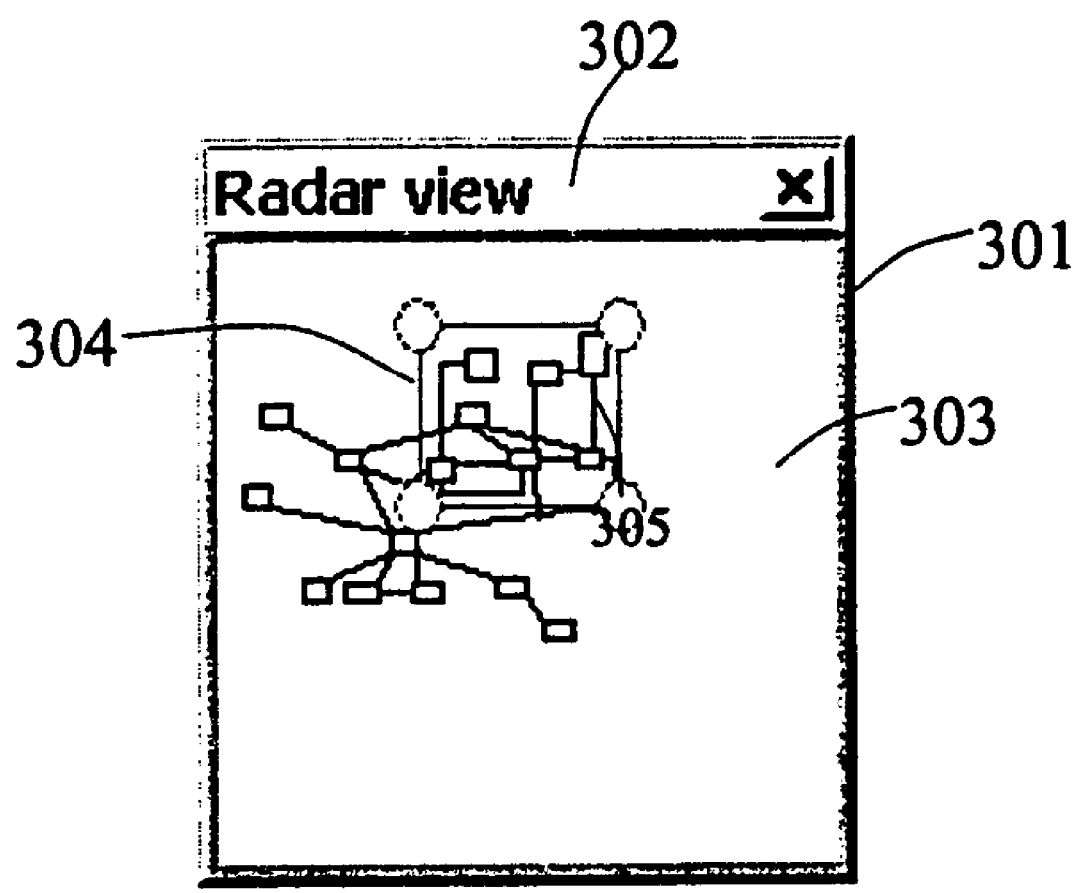
Figure 8:
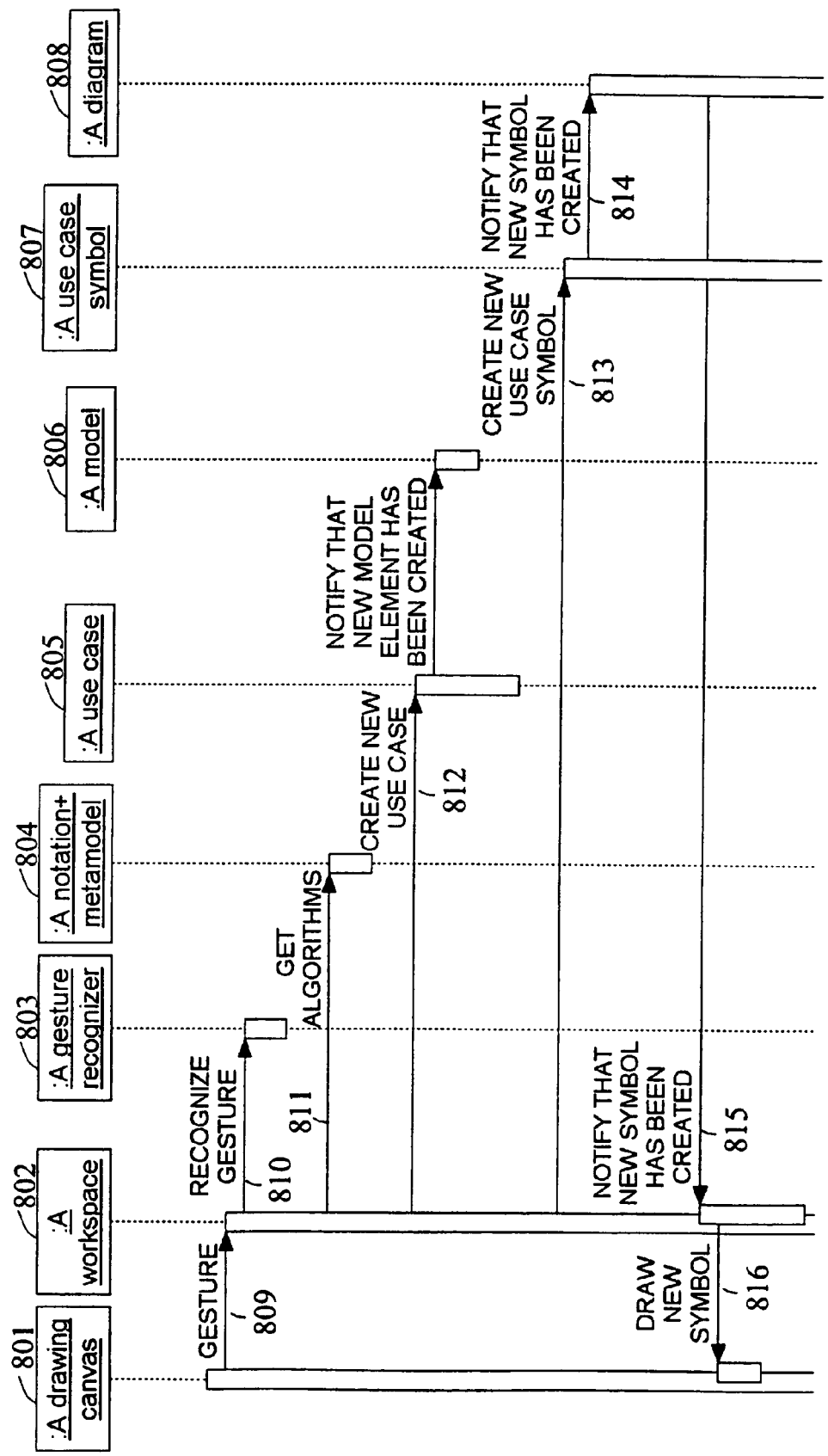
Figure 9B:
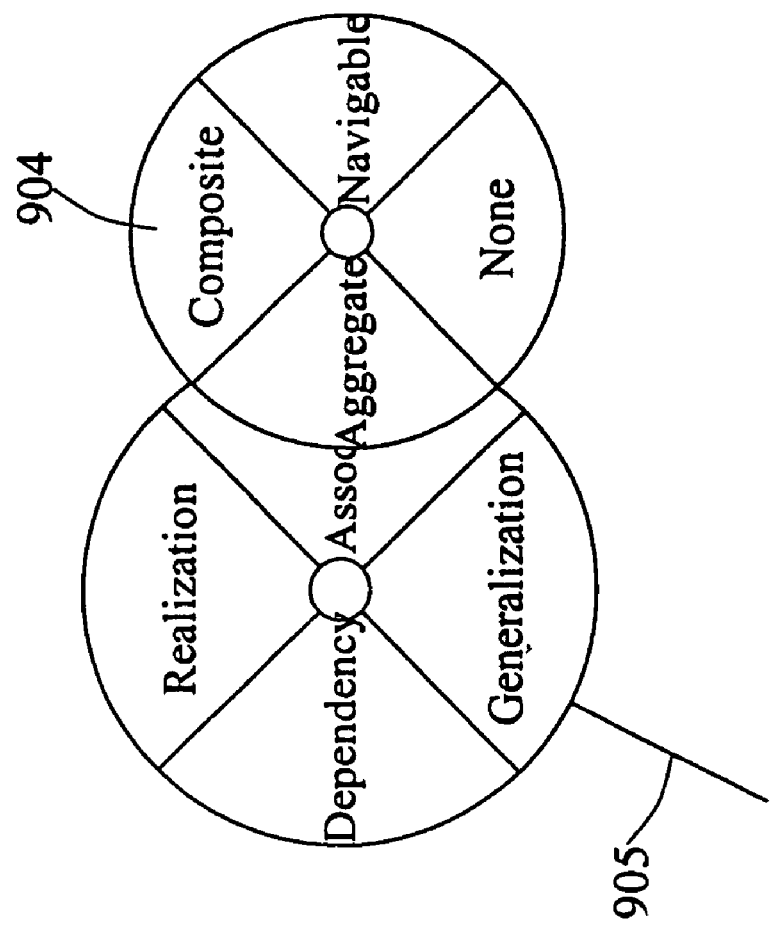
Figure 9A:
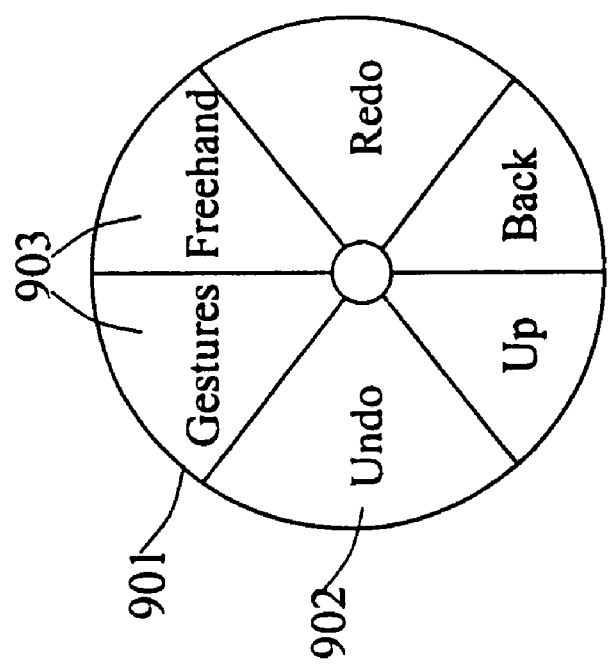
Figure 10:
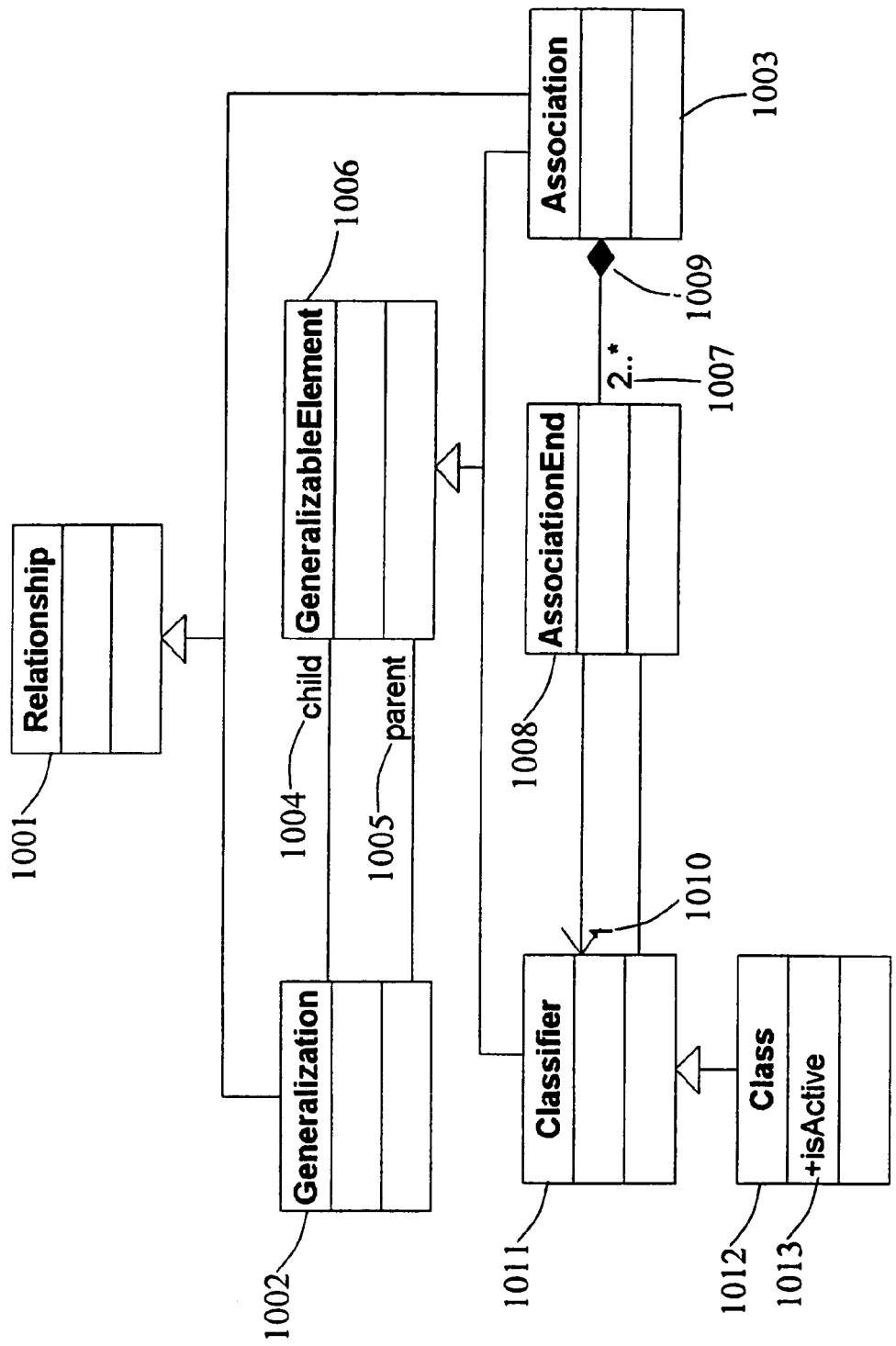

The invention will be explained in more detail with reference to the drawings, where FIG. 1 is a schematic drawing of a possible hardware setup according to the invention, FIG. 2 shows a typical appearance of the main drawing canvas of the invention, FIG. 3 shows a radar view of the drawing canvas in FIG. 2, FIG. 4 illustrates a drawn gesture and a corresponding UML element, a class, after transformation, FIG. 5 shows a line gesture and a corresponding UML element, an association, after transformation, FIG. 6 shows a gesture changing an association into a composition, FIG. 7 shows an overview of some of the available gestures for UML diagrams, FIG. 8 shows a UML sequence diagram, FIG. 9 shows examples of pie menus, FIG. 10 shows a UML class diagram FIG. 11 shows a one-curve gesture and a compound gesture.

DETAILED DESCRIPTION OF THE INVENTION

The invention extends existing external programs, as CASE tools, by providing an alternative user interface, which has support for creative, flexible, and collaborative modeling. The method according to the invention is embodied as a computer program, preferably being a link between the external program and an input and an output device.

Though UML is preferred, the invention in a general sense is not limited to UML, but can also be applied to other notations, such as the so-called flow charts [Boillot, M. H., Gleason, G. M., & Horn, L. W. (1995). *Essentials of Flowcharting*, McGraw-Hill] or Gantt charts [Clark, Wallace (1942). *The Gantt chart*, Sir I. Pitman & sons, ltd., London]. However, in the following, it will be assumed that the predetermined metamodel is the UML metamodel. The invention will also be explained in connection with an electronic whiteboard as input and output device, though the invention may be used with different input and different output devices.

As illustrated in FIG. 1, an electronic whiteboard 101 is the preferred input medium. An electronic whiteboard consists of a large area resembling a traditional whiteboard, which in addition is touch-sensitive, allowing for input, and contains a display, allowing for output. Examples of commercially available electronic whiteboards are the SMART Board™ and Mimio™, where a whiteboard is combined with a computer projector.

The electronic whiteboard 101 is functionally coupled to a computer 102, for example by a suitable electronic or optical bus 103 or by radio transmission, as a Bluetooth® link. Since a major design goal of the invention is to make the interaction similar to that of an ordinary whiteboard, the user interface displayed on the electronic whiteboard 101 is very simple: it is a white surface on which users can draw objects in diagrams, for example UML diagrams, with a pointing device, for example a dry pen.

As an alternative to a pointing device touching the whiteboard, it is also possible to use a remote pointer, which is moved in free space, where the movement is read by a remote control device converting the movement into corresponding coordinates which are shown on the whiteboard or on a computer screen.

FIG. 2 shows a so-called window 201 on the display of the whiteboard 101, appearing similar to known computer screen interfaces. The window 201, which is a drawing window in which elements are drawn and displayed, has a frame containing a top bar 202 with user information, for example the name of the loaded model 203, the current diagram type 204, the name 205 of the current diagram 219, and the name of the part of the model 206 that the current diagram 219 belongs to. Below the top bar 202 is a menu 207 containing buttons for invoking commands and changing options.

Below the menu is a drawing canvas 208 showing a part of the current diagram 219. The current diagram 219 comprises rectangular elements 209 representing UML classes. Each of these rectangular elements 209 is divided into three sub sections 210, 211, 212. The first sub section 210 contains identifying information about the class, for example the name of the class. The second sub section 211 contains information about the attributes of the class. The third sub section 212 contain information about the operations on the class.

Straight lines 213 may interconnect rectangular elements 209, 214. These lines 213 represent relationships, as for example UML Associations, Generalizations, or Dependencies, between UML classes. If the line represents an Association, it has a black diamond 215, a white diamond 216 at the end, an arrowhead 220 at the end, or it has no figure at the end 217. If the line represents a Generalization, it has a white triangle at the end 218.

FIG. 3 shows another window 301, a so-called radar window, which may be shown simultaneously on the display of the whiteboard. This window will generally be displayed considerably smaller than the drawing window 201. While only a part of the current diagram is shown in the first window 201, the entire current diagram is shown in this window 301, which is the reason for calling this a radar window or a window with a bird's eye view. The top bar 302 contains the name of the window 301. Below the top bar 302 is a display 303 showing the complete current diagram 219 of FIG. 2. This window 301 has an indicator 304 indicating which part of the current diagram 219 is actually shown in the first window 201.

The radar window 301 shows the fill diagram 219, part of which is also shown in the drawing canvas 208 of the first window 201. To pan, the user can drag the rectangular indicator 304 in the drawing canvas 303 by pressing the pointing device, in the following for simplicity called pen, inside the rectangular indicator 304 and moving the pen across the drawing canvas 303. To zoom, the user can press the pen against the canvas at the position of one of the circular indicators 305 and move the pen across the canvas. A zoom results in a resize of the rectangular indicator 304 and, consequently, of a zoom in the drawing canvas 208 of the first window 201. In order to provide overview and context awareness, one or more floating radar windows 301 can be displayed on the display of the whiteboard 101. Using several radar windows 301, multiple users can have convenient access to pan and zoom on the relatively large whiteboard 101.

The input on the drawing canvas 208 of the whiteboard 101 can be performed in two operating modes: an informal freehand mode and a formal mode according to a predetermined metamodel for example the UML metamodel or a comparably extended or limited metamodel.

In freehand mode, the user may add arbitrary annotations to the diagram 219, where the annotations are left as-is and are not interpreted as UML elements.

In UML mode, the strokes of the user are interpreted as UML elements. For example, to create a new UML class, the user can draw a gesture with the approximate form of a rectangle with a pen on the drawing surface 208, which will ultimately result in the creation of a new UML class, which is displayed as a rectangle further containing two horizontal lines. The situation is illustrated in FIG. 4a and FIG. 4b. The user draws a rectangle 401 by touching the drawing canvas 208 of the whiteboard 101 with a pointing device, for example a dry pen, staring, for example, at a location for the upper left corner 402 of the rectangle 401 and going counter-clockwise in a rectangular fashion, which is illustrated in FIG. 4a. The stroke will appear on the canvas as a squiggly drawn rectangle as if the pen had left ink on the whiteboard. When the user lifts the pen, the drawn rectangle 401 is recognized at a particular position and with a particular size and, as illustrated in FIG. 4b, a rectangle 406 representing a UML class is displayed on the drawing canvas 208 of the whiteboard 101 instead of the gesture 401.

A rectangular element may also be recognized as a UML class, if the drawing of the rectangle 401 is performed in a different way by starting in any of the four corners 402, 403, 404, 405 and in clockwise as well as in counter-clockwise direction. Because the gesture 401 is visually similar to the symbol 406 for a UML class—they are both rectangles—the interaction is direct and intuitive.

A likewise interaction is used when the user wants to create other types of UML elements. A further example is illustrated in FIG. 5a and FIG. 5b. If the user wants an association between two classes, the user just draws a line 501 between the rectangular elements 502, 503 representing the classes, which is illustrated in FIG. 5a The line 501 is drawn from the upper rectangular element 502 to the lower rectangular element 503. The line 501 is recognized as the gesture for an association, after which the hand-drawn line 501 is converted to a straight line 504 as shown in FIG. 5b; the straight line 504 represents an association. The user can change the association to a composition type of association, which is illustrated in FIG. 6a and FIG. 6b. The user draws a diamond 601 at one end of the line 602 in FIG. 6a, which leads to a different interpretation, such that the line 602 in connection with the diamond 601 is recognized as a composition 603 as shown in FIG. 6b.

There are gestures for creating most UML elements as well as for other common operations such as deleting and moving elements. A subset of the possible recognizable gestures is shown in FIG. 7. The fist column 701 contains the gestures. The small dot 706 on the gesture indicates where the gesture should begin The second column 702 describes one of the algorithms associated with each gesture. The third column 703 shows an example diagram with the gesture in the first column 701 drawn, in a situation where the algorithm in the second column 702 is assigned. The resulting diagram after drawing the gesture is shown in the fourth column 704. The last column 705 lists some of the variations of each gesture.

An important aspect for the user-friendliness of the method according to the invention is a visual similarity of the gesture to be drawn and the following illustration on the output device of the linked algorithm. As classes are represented by rectangular shapes in a diagram, drawing of a rectangle will be interpreted as adding a class to the model. This is intuitive for a user and easy to remember.

A gesture recognition algorithm is used to recognize the gestures that users draw, i.e., to link an input gesture to one or more predetermined general gestures. One such algorithm is Rubine's algorithm. This algorithm has the advantage of being relatively easy to train: To add a new gesture command, one simply draws a number of gesture examples. Potential problems with this algorithm, and gesture recognition according to prior art in general, is that, usually, only a limited number of gestures can be recognized and that no feedback is given while gestures are drawn, except the link that shows the shape of the gesture. To overcome these problems, the principles of compound gestures and eager recognition, respectively, are used in connection with the invention.

The principles of compound gestures [Landay, J. A. & Myers, B. A. (1995). Interactive Sketching for the Early Stages of User Interface Design. In *Proceedings of CHI'95*, 45–50] combine gestures that are either close in time or space to one diagram element. For example, a user can change a UML association (represented by an undecorated line) to a unidirectional association (represented by a line with an arrowhead) by drawing an arrowhead at the appropriate end of the line. In this way, users can gradually build up a diagram, refining it step-by-step. Another advantage of using compound gestures is that it reduces the number of different shapes that the recogniser should distinguish between and thus increases the recognition rate, and it does this without limiting the variety of diagrams that the users can create.

The principle of eager recognition is that gestures are continuously tried to be classified while being drawn. When a gesture is recognized and interpreted, feedback is given to show that the gesture has been recognized. Among others, this feature is used for moving elements with a gesture: when the move gesture has been recognized, the rest of the gesture is used as parameters to the move command, and the elements located at the starting point of the gesture will follow the pen while it is pressed down—like in an ordinary drag-and-drop desktop computer application.

Some gestures always result in an action, which is independent of the location inside the drawing window 201 on the drawing canvas 200. If a user draws a rectangle, a UML class is created independent of the location. This is also true for other UML elements such as packages, use cases, actors, and comments. Other gestures have different effects, depending on where they are made.

For example, a triangle drawn near the end of a UML association will turn the association into a UML generalization, but a triangle drawn on a UML class has no effect. Another example is a line: A line drawn from a UML class to another UML class will create a UML association between the classes, but a line drawn from a UML class to a UML comment will create a UML dependency, because UML associations are not allowed between classes and comment in the UML metamodel. A further example: A triangle drawn near the end of a UML dependency attached to a UML class will turn the dependency into a UML generalization. However, if the dependency is attached to a UML comment, the triangle has no effect, because UML generalizations are not allowed to be attached to comments by the UML metamodel.

In one embodiment of the invention, the gesture recogniser is programmed to distinguish between only the basic shapes, some of which are shown in the first column 701 of FIG. 7. The small dot 706 on each gesture denotes the beginning of the gesture. Thus, in order to create a UM class, the user should draw a rectangle starting in the upper left corner and drawing counter-clockwise 706. However, different users draw the same shapes in different ways. For example, some users prefer to draw a rectangle clockwise. In order to cope with this problem, the gesture recogniser in another embodiment of the invention has been programmed to not only contain the shapes in the first column 701, but also a number of strokes that can be derived from those basic shapes, for example, normal rotation, mirror projection, resizing, stretching, and reversion 705. For example, in order to handle lines in any direction, general line shape gestures exist for 16 different directions. Similarly, the other basic shapes have been generalized.

However, the recognition rate decreases as the number of different shapes increases. By rotating and inverting basic shapes, the number of generalized shapes increases by an order of magnitude, requiring higher computer power to distinguish the shapes properly.

In order to optimize the number of generalized shapes dependent on the computer power, it is possible to choose a limited number of shapes and a limited number of transformations in the generalisation process. User studies have shown that left-handed and right-handed persons draw differently (clockwise vs. counter-clockwise), and this is important to support. On the other hand, it is acceptable to force the users to draw a rectangle starting in one of the upper corners.

A UML sequence diagram in FIG. 8 shows a working sequence according to the invention, where a gesture is drawn on the drawing canvas 208. The eight boxes 801–808 in the upper part of the figure represent different components of the computer program implementing the method according to the invention. Time is represented by a vertical axis starting in the upper part of the figure and directed downwards with time.

Initially, a user draws a gesture with the pointing device 809, in the following for simplicity called a pen, on the drawing canvas 208 in the window 201 on the whiteboard 101. During the drawing action on the drawing canvas 208, the stroke with the pen touching the whiteboard is read electronically and converted to coordinates. The path of the pen on the drawing canvas 208 is displayed as a curve on the canvas 208.

The workspace 802 is a component in the program, which coordinates the interaction with the users. The physical drawing canvas 208 in FIG. 2 is represented by a corresponding program component 801 in FIG. 8. It is controlled by the workspace component 802, which receives the user inputs and displays the results of user inputs in the drawing canvas 801. The workspace 802 has access to a gesture recogniser 803, which is an algorithm in the program, for example Rubine's algorithm [Rubine, D. (1991). Specifying Gestures by Example. In *Proceedings of SIGGRAPH*'91, 329–337]. The workspace 802 also has access to a predetermined metamodel and a notation 804.

When the user has drawn an input gesture on the drawing canvas 208 and this is read by the corresponding computer program component 801, it is received 809 as a data set by the workspace 802. The workspace 802 in turn sends 810 the data set representing the input gesture to the gesture recogniser 803. The gesture recogniser 803 then identifies a number of general gestures that approximately resemble the input gesture. The gesture recogniser 803 sends the identified general gestures back to the workspace 802 together with some information about the similarity between the input gesture and the identified general gestures, for example a quantitative indication of the probability that each chosen general gesture is the one that visually resembles the input gesture the most.

In the next step 811, the specific algorithm or algorithms associated with the gesture are identified with corresponding allowance based on the actual metamodel and notation 804, for example, the UML metamodel's use case diagram notation. In case of allowance, the specific algorithm is then executed 812.

In the following, some examples are given depending on, whether the notation is a UML class diagram or a UML use case diagram:
1. If the gesture is drawn on a UML class diagram, and the gesture is a rectangle, then a new UML class is created.
2. If the gesture is drawn on a ML class diagram, and the gesture is a triangle, then any UML associations or UML dependencies close enough to the gesture should be turned into UML generations.
3. If the gesture is drawn on a UML use case diagram, and the gesture is a rectangle, then the gesture is ignored, because there are no algorithms associated with the rectangle gesture on a use case diagram (there are no rectangle-shaped UML elements, such as a UML classes, on use case diagrams).

In FIG. 8, the specific algorithm is creating a new UML use case 812 and a new symbol for the use case 813. The new symbol is then added 814 to a diagram 808. The workspace 802 observes changes in the diagram component 808 of the program, so the workspace 802 is notified when the new symbol has been added to the diagram component 808 of the program. The workspace 802 reacts by ordering the drawing canvas component 801 to draw the symbol on the drawing canvas 208 in the window 201.

So-called Observers [Gamma, E., Helm, R., Johnson, R., & Vlissides, J. (1995). *Design Patterns: Elements of Reusable Object-Oriented Software*. Addison Wesley Longmar] can be attached to a diagram component 808. Observers are notified when elements have been created, changed, or deleted. Generally, observers are used for a variety of purposes in connection with the invention. For example, as described above, the workspace 802 uses an Observer in its implementation: when a diagram element (symbol) is created 813, the workspace 802 creates a corresponding visual representation 816 of the new diagram element in the workspace 208 on the whiteboard. The small radar window is also updated by observance of the diagram component 808. Observers are used for various other things, such as debugging and integrating with CASE tools.

As illustrated in FIG. 9a, a context-dependent marking pie menu 901 [Kurtenbach, G. (1993). *The Design and Evaluation of Marking Menus*. Unpublished Ph.D. Thesis, University of Toronto] is provided to enable easy access to less common operations. The user may either press the pen against the surface of the drawing canvas 208 for a short while in order for the menu to pop up, or make a short stroke (mark) in the direction of the desired command according to the pie menu. For example, in order to undo a previous action, the user can press the pen for a short while and choose the "undo" segment 902. The user may also just make a short left stroke, i.e., in the direction of the "undo" segment 902. The marking pie menus are also used to switch between gesture recognition mode and freehand mode 903.

The marking pie menus are context-dependent, meaning that, depending on the immediate context of the stroke or press, a specific pie menu will be activated. For example, the pie menu in FIG. 9a is activated when no element is below the pen, where it touches the whiteboard, whereas the pie menu in FIG. 9b is activated when the pen is pressed near the end of a relationship, for example, a UML generalization 905.

Marking pie menus support the interaction on large surfaces, such as the drawing canvas 208 on a large whiteboard 101, well, because they are always ready at hand unlike usual buttons and menus. Apart from supporting a transition from initial to expert use, the marking menus also conveniently provide an alternative way of creating certain diagram elements. This situation is shown in FIG. 9b, where the user has activated a hierarchical pie menu near the end of a UML generalization 905 and can choose to, for example, turn the generalization into a composite association 904.

In order to differentiate between the contributions of each person in a group working together on the same diagram, the invention has foreseen personal pointing devices, for example pens, for drawing on the whiteboard. For each pen, there is the possibility of a separate gesture set, separate modes, separate colors, adding of user-defined stereotypes to diagrams, or other personal settings.

So-called filtering has also been considered with the invention. After a diagram has reached a certain size, it becomes hard to overview, and navigation in the drawing canvas 208 becomes time consuming. Therefore, it is possible to selectively hide parts of a model, or give drawing elements temporality, so that elements may exist only for a certain period of time. Also, users may employ a specific semantic filtering to decide the important elements of a diagram. Such a filtering may result in that only the name of a class 210 is shown, or that modeling is restricted to the part of an application related to the user interface.

In one embodiment, the invention is implemented with the programming language incr-Tcl [McLennan, M. J. (1993) [incr Tcl]: Object-Oriented Programming in Tcl/Tk. In *Proceedings of the Tcl/Tk Workshop*, University of California at Berkeley, June 10–11], which is an object-oriented extension of Tcl/Tk [Ousterhout, J. (1990). Tcl: An Embeddable Command Language, in *Proceedings of the Winter* 1990 *USENIX Conference,* January 22–26, Washington, D.C., USA], and runs on the UNIX, LINUX and Microsoft Windows® platforms.

The internal data model or data structure in the computer program implementing the method according to the invention is based on a metamodel, for example, the UML metamodel. A simplified part of the UML metamodel version 1.3 is shown in FIG. 10 using the UML notation itself, namely a UML class diagram.

From the diagram in FIG. 10, it is apparent that a Relationship 1001 is a Generalization of both Generalization 1002 and Association 1003, meaning that Generalization 1002 and Association 1003 are both a kind of Relationship 1001. We can also see that a Generalization 1002 has a child element 1004 and a parent element 1005. In other words, a Generalization connects two GeneralizableElements 1006 in a special kind of Relationship 1001. FIG. 2 contains an example of a Generalization 218.

Also apparent from the diagram in FIG. 10 is that an Association 1003 contains 1009—in a composite Association—to two or more 1007 AssociationEnds 1008. Each AssociationEnd 1008 refers to exactly one 1010 Classifier 1011. A Classifier 1011 is a Generalization 1002 of a Class 1012, i.e., a Class 1012 is also a Classifier 1011—a Class 1012 just has some extra features that a Classifier 1011 does not have, for example, an "isActive" attribute 1013. In FIG. 2, there are also several examples of Associations 215, 216, 217.

This way the UML metamodel defines how a UML model is allowed to be constructed.

Besides validating models, the metamodel is also used when storing actual models. A given metamodel can be translated into a data structure, which can be used in the implementation of a program that operates on models according to that metamodel. The program according to the invention is based on this translation. For example, the UML metamodel is used to implement the program, and the metamodel is thus a part of the program.

It is impossible to implement one tool that supports all activities in software development. The program according to the invention has a user-friendly interface, making it easy to construct big and complex models. However, many software developers do not just use the models as they are—they also use models for code generation, database generation, etc. Thus, it is important that the program according to the invention is able to exchange models with other tools that support these activities.

One way to exchange models is through a common interchange format, for example, in the form of a file. XMI [XMI Partners (1999). *XML Metadata Interchange (XMI) 1.1 RTF Final Report*. OMG Document ad/99-10-04, October 20] is an accepted Object Management Group (OMG) specification that provides the basis for an interchange format for models such as UML models. The specification is general in the sense that it specifies a way of creating an interchange format for any data that can be described by a metamodel.

The XMI standard uses XML DTD's (extensible Markup Language Document Type Definitions [W3C (1998). *Extensible Markup Language (XML)* 1.0. W3C Recommendation REC-xml-19980210, 10 Feb. 1998. Available online at http://www.w3.org/TR/1998/REC-xml-19980210. ]) and the actual exchange files are then XML files conforming to this DTD. In other words, XMI specifies a set of rules for mapping a metamodel to a DTD, and a way of mapping a model to an XML file conforming to this DTD. Based on the UML metamodel, several companies have produced a UML DTD using the rules in the specification.

Another way to exchange models with other tools is through runtime connections to those tools. Such synchronous integration is typically component-based. The most widespread component technologies are CORBA™ [Henning, M., Vimoski, S. *Advanced CORBA Programming with C++*. Addison Wesley Longman, 1999] and Microsoft COM® [Rogerson, D. (1997). *Inside COM: Microsoft's Component Object Model*. Microsoft Press]. The choice of component technology is not essential for the invention, but since most CASE tools today only support COM®, COM® is preferred. The implementation of synchronous integration is thus based on runtime COM® connections with other CASE tools.

If a user wants to work on an existing model made in a CASE tool, the initial synchronization includes transferring the model to the program according to the invention. It may also be the case that both the CASE tool and the program according to invention contain models that should be used in a modeling session. In this case, the synchronization is a merge of the two models.

While synchronizing between the CASE tool on the one hand and the program according to the invention, a mapping between the data in these two programs is built. The mapping is used in the incremental synchronization, allowing, for example, a change to a class in the program according to the invention to be propagated to the corresponding class in the CASE tool.

In order to keep the models in the CASE tool and the program according to the invention synchronized after the initial synchronization, changes in one model should propagate to the other model. For this purpose, two integration-specific Observers observe the models. The Observer of the CASE tool relies on COM® events.

If, for example, a new class is created in the program according to the invention, an Observer will get notified, and it will then cause the new class to be transferred to the CASE tool. In a similar way, changes to, or deletion of, existing elements in the program according to the invention will be propagated to the CASE tool. Updates in the CASE tool are propagated to the program according to the invention in a similar way.

A third way of exchanging models with other tools is to have the program according to the invention and the other tools work synchronously on the same data. This is not much different from the situation described above, where the program according to the invention and the Case tool have separate data, and where the data thus has to be synchronized. It would be easy to modify the program according to the invention to work on, for example, a Rational Rose® data structure, instead of having its own data, which, conceptually, is just a copy of the data in Rational Rose®. However, by having its own data, the program according to the invention can run as a stand-alone tool without Rational Rose®. Also, if the program according to the invention uses Rational Rose's data format, it cannot run with Microgold WithClass® or any other tool.

Further Applications

As mentioned above, the method and computer program according to the invention can be used in combination with a variety of external programs, as for example CASE tools. Further possible applications are mentioned in the following.

A number of computer programs are available for process engineering, the so-called Computer Aided Process Engineering, CAPE, which are suitable for creation or optimization of processes in industry. CAPE tools are, for instance, also used for design for chemical or mechanical production plants and for the design and optimization of pipeline systems in such plants or in general. Such kinds of programs are commercially available from companies as Aspen Technology, for example Aspen Engineering Suite™, Hyprotech Lifecycle Innovation, for example the HYSYS™ program family, and EPCQN International, for example AIChE DIPPR®.

From these companies, CAPE tools are available not only for hardware design, for example chemical plants, refineries, production lines, venting systems, pipeline systems, flare and vent systems, distillation Systems, but also for process design, simulation and evaluation, for example polymer process analysis and design, general energy optimisation, petrochemically planning, food production, semiconductor production processes, and general component interaction simulation, where also profitability, administration and operation optimisation is included. Including profitability and administration in these programs is important in order to achieve optimisation not only for the process, for example production, in terms of time and efficiency, but also to find and control the commercially most attractive configuration.

Further computer tools, for example from Aspentech, are available for teaching several of the above-mentioned processes at universities. Especially in this case, a method according to the invention is useful. Typically, students will discuss projects during the design phase. Including a whiteboard with gesture recognition and feed-back according to a predetermined metamodel promotes the interactivity during these discussions.

Today, there is no single agreed-upon metamodel for expressing processes, which means that different tools implement different metamodels. However, work on creating a unified metamodel is in progress, and this will improve the interoperability of the tools implementing the unified metamodel. One step towards a unified metamodel has been taken with the VeDa metamodel (Bernd Lohmann: Towards Supporting the Workflow during Computer-Aided Modeling of Chemical Processes, Fortschritt-Berichte VDI, Reihe 3:Verfahrenstechnik, Nr. 531, ISBN 3-18-353103-8, Düsseldorf, 1998).

Another example of an application of a method and program according to the invention is design of electronic circuits by diagrams, where only functionable connections between electronic components are accepted during the design. When connected, voltages and currents may be indicated on the various electronic connections and components, which facilitates the understanding of the diagram as a whole and of the influence of the individual component on the remaining electronic circuit.

Still another example of an application is town planning, where statutes and regulations have to be taken into account. During the planning in a diagram on the whiteboard, certain elements as schools, highways, factories, and parks may only be added in accordance with those regulations. Furthermore, the metamodel may also regulate allowance of element placement in accordance with geographical conditions. For instance, a power plant may only be placed at a location, where a cooling water supply, as a river, is available. Another example may be the denial of highways in a diagram where the landscape in the diagram is filled with mountains.

A further example is general architecture. For the design of a house, a number of regulations or just practical conditions have to be taken into account. Electrical installations are subject to a number of regulations. Regulations may also govern the overall outside appearance of the building. These regulations and conditions may be used for control of the design preventing mistakes and reducing the overall building costs.

A still further example is the design of vehicles, ships and aeroplanes subject to rules, conditions and regulations to be taken into account.

An even further example is the composition of music, where a team of composers work on the same composition. By the metamodel, the time sequences for the single musicians may be controlled, and it may be indicated, if a passage is too difficult for the musician according to certain models.

An even still further example is the design of games, especially electronic games. In a variety of so-called adventure games, the single figures in a game have certain characteristics. Designing a game requires a thorough control of possible reactions of these figures, which during design on a whiteboard may be controlled in accordance with a metamodel.

For the design of comic movies, a method according to the invention is especially useful as well. In case a comic figure is to perform a movement, the figure may be drawn on a whiteboard in one initial posture and in one final posture. By the metamodel, this figure moves in a certain characteristic way, for example heavy and slow or fast and staccato-like. Thus, the program automatically may design the complete movement of the figure from the initial posture to the final posture in accordance with the characteristic way.

The method according to the invention may be used for the generation of sale plans, where a company may have certain rules for the sale and distribution of goods. These rules may be contained in the metamodel such that only sales plans are accepted which are in accordance with these rules. This way, wrong planning may be prevented for the companies and large amounts of cost may be saved.

Planning in accordance with regulations is also known from hospitals, where resource allocation has to be controlled thoroughly. Also in this case, metamodel restrictions may support the interactive planning in a very useful way prohibiting mistakes that may be annoying for the personnel and maybe fatal for patients.

In connection with financial planning, the method according to the invention may be used with spreadsheets and related diagrams on a whiteboard, where financial models may be discussed by a group of collaborators. Also, SAP® applications can work in combination with the invention facilitating financial planning in a variety of companies.

The invention claimed is:

1. Method for gesture based modeling of a diagram representing the graphical notation for a model, the method comprising:
   providing a model represented by a diagram, the diagram including a number of general diagram elements and possible relations between these general diagram elements,
   providing a number of predetermined general gestures stored in a database of a computer system, the general gestures comprising a pattern of one or more curves, each general gesture linked to at least one general algorithm for modification of the diagrarm,
   providing an input device functionally connected to the computer system and reading of an input gesture by the input device, the read input gesture being a sensed movement of a hand along one or more curves,
   providing a graphical output device and giving a feedback on the output device in the form of a curved shaped exactly as the movement alone one or more curves as read by the input device,
   comparing by software routines in the computer system said input gesture with said number of stored predetermined general gestures, identifying a specific gesture among said predetermined general gestures as resembling said input gesture,
   assigning in the computer system among said at least one general algorithm a specific algorithm to said specific gesture,
   wherein said method comprises providing in the computer system a metamodel for said model, said metamodel defining how a model may be constructed, and determining the allowance of said specific algorithm according to said metamodel and model and, in case of allowance,
      upon request as a response to said specific gesture modifying said model in accordance with said specific algorithm,
      upon request modifying the a diagram representing said model on an output display to indicate the response to said input gesture.

2. Method according to claim 1, wherein said input gesture has visual similarity with an element created or modified in response to said input gesture.

3. Method according to claim 1, wherein said identifying is linked to a quantitative measure reflecting the possibility for that said specific gesture resembles said input gesture.

4. Method according to claim 1, wherein said method further comprises adapting the model format of said model to a external format readable by an external computer program.

5. Method according to claim 4, wherein said external computer program is a CASE tool computer program, preferably Rational Rose® or Microgold WithClass™, or a CAPE tool computer program.

6. Method according to claim 4, wherein said method further comprises reading of a response from said external computer program and changing said external format to a format in congruence with said model.

7. Method according to claim 1, wherein said model is linked to a modeling language supporting object-oriented modeling.

8. Method according to claim 7, wherein said modeling language is UML.

9. Method according to claim 1, wherein said identifying of said one specific of said predetermined general gestures implies Rubine's algorithm.

10. Method according to claim 1, wherein said reading of said input gesture is from an input device which comprises at least one from the group consisting of a touch-sensitive computer screen, touch-sensitive whiteboard, a drawing tablet, a mouse, a pen-based computer, ajoy stick system coupled to a computer, or a movement sensor system.

11. Method according to claim 1, wherein said reading of said input gesture is from a database in which a sequence of input gestures is stored.

12. Computer program comprising program code performing the method according to claim 1 when said program is run on a computer.

13. Computer program product comprising program code means stored on a computer readable medium for performing the method according to claim 1 when said computer program product is run on a computer.

14. Method according to claim 1, wherein the method implies the step of using the model for design and optimization of chemical or mechanical production plants, production lines, refineries, pipeline systems, flare and vent systems, or distillation systems.

15. Method according to claim 1, wherein the method implies the step of using the model design, simulation, administration, evaluation and optimization of production processes.

16. Method according to claim 1, wherein the method implies the step of using the model design, simulation, administration, evaluation and optimization of production processes for polymers, semiconductors, petrochemical products, or food products.

17. Method according to claim 1, wherein the method implies the step of using the model teaching of students in design, simulation, administration, evaluation and optimization of processes.

18. Method according to claim 1, wherein the method implies the step of using the model for design, simulation, evaluation and optimization of electronic circuits, vehicles, ships, airplanes or parts thereof.

19. Method according to claim 1, wherein the method implies the step of using the model for town planning or general architecture.

20. Method according to claim 1, wherein the method implies the step of using the model for composition of music.

21. Method according to claim 1, wherein the method implies the step of using the model for design of games or movies.

22. Method according to claim 1, wherein the method implies the step of using the model for generation of sale plans or goods distribution plans.

23. Method according to claim 1, wherein the method implies the step of using the model for resource allocation in hospitals.

* * * * *

UNITED STATES PATENT AND TRADEMARK OFFICE
CERTIFICATE OF CORRECTION

PATENT NO. : 7,096,454 B2  
APPLICATION NO. : 10/240188  
DATED : August 22, 2006  
INVENTOR(S) : Damm et al.

It is certified that error appears in the above-identified patent and that said Letters Patent is hereby corrected as shown below:

Title Page

Insert:

Item (30) Foreign Application Priority Data

March 30, 2000    (DK) ........................ 2000 00538  
   January 23, 2001    (DK) ........................ 2001 00112

Signed and Sealed this

Twenty-sixth Day of December, 2006

JON W. DUDAS  
*Director of the United States Patent and Trademark Office*